(12) United States Patent
Phung et al.

(10) Patent No.: US 6,370,469 B1
(45) Date of Patent: Apr. 9, 2002

(54) CRUISE CONTROL METHOD

(75) Inventors: Tam Anh Phung, Stanford, CA (US);
Ronald C. Allison, Clio, MI (US);
James R. Yurgil, Livonia, MI (US);
Thomas Eugene Bolander, Flint, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/592,831

(22) Filed: Jun. 13, 2000

(51) Int. Cl.[7] .............................................. G06F 17/00
(52) U.S. Cl. ......................................... 701/93; 180/172
(58) Field of Search ............................... 701/82, 83, 84, 701/93, 91, 72; 180/197, 172

(56) References Cited

U.S. PATENT DOCUMENTS

| 4,138,723 | A | | 2/1979 | Nehmer et al. ............... 701/93 |
|---|---|---|---|---|
| 4,987,357 | A | | 1/1991 | Masaki ....................... 318/587 |
| 5,781,103 | A | | 7/1998 | Gilling ....................... 340/441 |
| 5,868,474 | A | * | 2/1999 | Abe et al. ..................... 303/140 |
| 6,044,321 | A | * | 3/2000 | Nakamuya et al. ........... 701/96 |
| 6,188,945 | B1 | * | 2/2001 | Graf et al. ..................... 701/58 |

* cited by examiner

Primary Examiner—Tan Nguyen
Assistant Examiner—Edward Pipala
(74) Attorney, Agent, or Firm—Anthony Luke Simon

(57) ABSTRACT

A method of controlling a cruise control system, comprising the steps of: assigning a low lateral acceleration limit; assigning a high lateral acceleration limit; determining a lateral acceleration of a vehicle; comparing the lateral acceleration to the low and high lateral acceleration limits; monitoring a torque command of a torque control computer at least where the lateral acceleration is above the low lateral acceleration limit; and compensating the torque command by setting the torque command equal to a minimum torque command where the lateral acceleration is between the low and high lateral acceleration limits and the torque command increases.

9 Claims, 5 Drawing Sheets

CRUISE CONTROL METHOD

TECHNICAL FIELD

The present invention relates to a method of controlling a cruise control system.

BACKGROUND OF THE INVENTION

Vehicle cruise control controls typically are optimized for when the vehicle is driving substantially straight.

SUMMARY OF THE INVENTION

The present invention provides a cruise control that selectively employs a strategy beneficial during traversal of a curved road section.

Advantageously, in an example operation, cruise control according to the present invention includes a software program which processes a number of inputs including lateral acceleration, differential lateral acceleration, torque command, and vehicle performance constants. The value of lateral acceleration is obtained from a brake control computer of the vehicle, from a lateral acceleration sensor, or derived from steering angle and vehicle speed. The value of torque command is obtained from a torque control computer of the cruise control.

In operation of the program, the lateral acceleration is monitored to determine if it has exceeded one of two thresholds. The first threshold is a low lateral acceleration limit and the second threshold is a high lateral acceleration limit. When the lateral acceleration of the vehicle is below the low lateral acceleration limit, the program does not compensate the cruise control torque command. When the lateral acceleration of the vehicle exceeds the low lateral acceleration limit, the torque command is monitored. During this monitoring, if the lateral acceleration of the vehicle remains constant or decreases, the program does not compensate the torque command; however, if the lateral acceleration increases, the torque command is compensated by setting the torque command equal to a minimum torque command, thereby clamping the torque command to the minimum torque command value. When the lateral acceleration of the vehicle exceeds the high acceleration limit, the torque command is further compensated by subtracting a calculated torque offset from the minimum torque command value.

These and additional objects, advantages, features and benefits of the present invention will become apparent from the following specification.

DETAILED DESCRIPTION OF THE PREFERRED EMBODIMENTS

Figure 1:
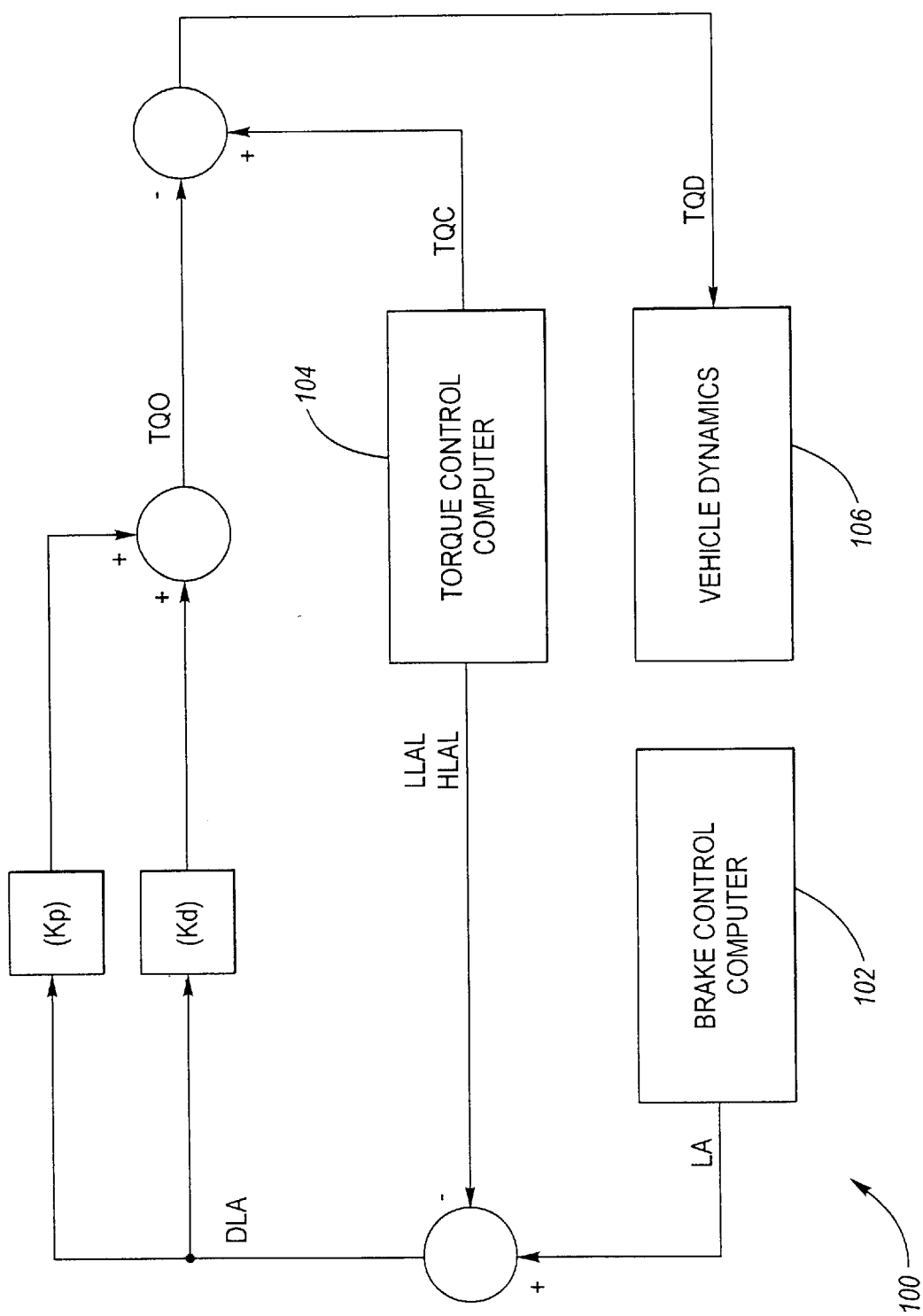
FIG. 1 is a block diagram of a cruise control in accordance with the present invention.

With reference now to the drawings, FIG. 1 shows a block diagram of an example cruise control 100 according to the present invention interfaced with data input sources, as for example including a brake control computer 102, and further interfaced with data receiving vehicle dynamics 106, as for example a throttle controller. The cruise control 100 includes a torque control computer 104 which provides a torque command and a software program (see FIG. 3) which selectively compensates the torque command. The software program combines lateral acceleration (LA) of the vehicle (commonly measured in "G's") differential lateral acceleration (DLA) of the vehicle as measured over a time interval (T), cruise control torque command (TQC), and predetermined vehicle constants. The value of LA is obtained from a brake control computer 102, from a lateral acceleration sensor or from the steering angle related to vehicle speed (VS). The value of DLA is obtained by subtracting LA from a high lateral acceleration limit (HLAL), and is expressible by the relation:

$$DLA = LA - HLAL. \quad (1)$$

The value of rate of change of DLA (RDLA) is measured by sampling DLA at particular times (T). Each sampling of DLA is assigned a consecutive number (k). The value of RDLA is expressible by the relation:

$$RDLA = (DLA_k - DLA_{k-1})/T. \quad (2)$$

As mentioned, the value of TQC is obtained from the torque control computer 104 of the cruise control 100. The value of LA is monitored to determine if it has exceeded one of two lateral acceleration limits, wherein a first lateral acceleration limit is a low lateral acceleration limit (LLAL) and a second lateral acceleration limit is the high lateral acceleration limit (HLAL).

Figure 2:
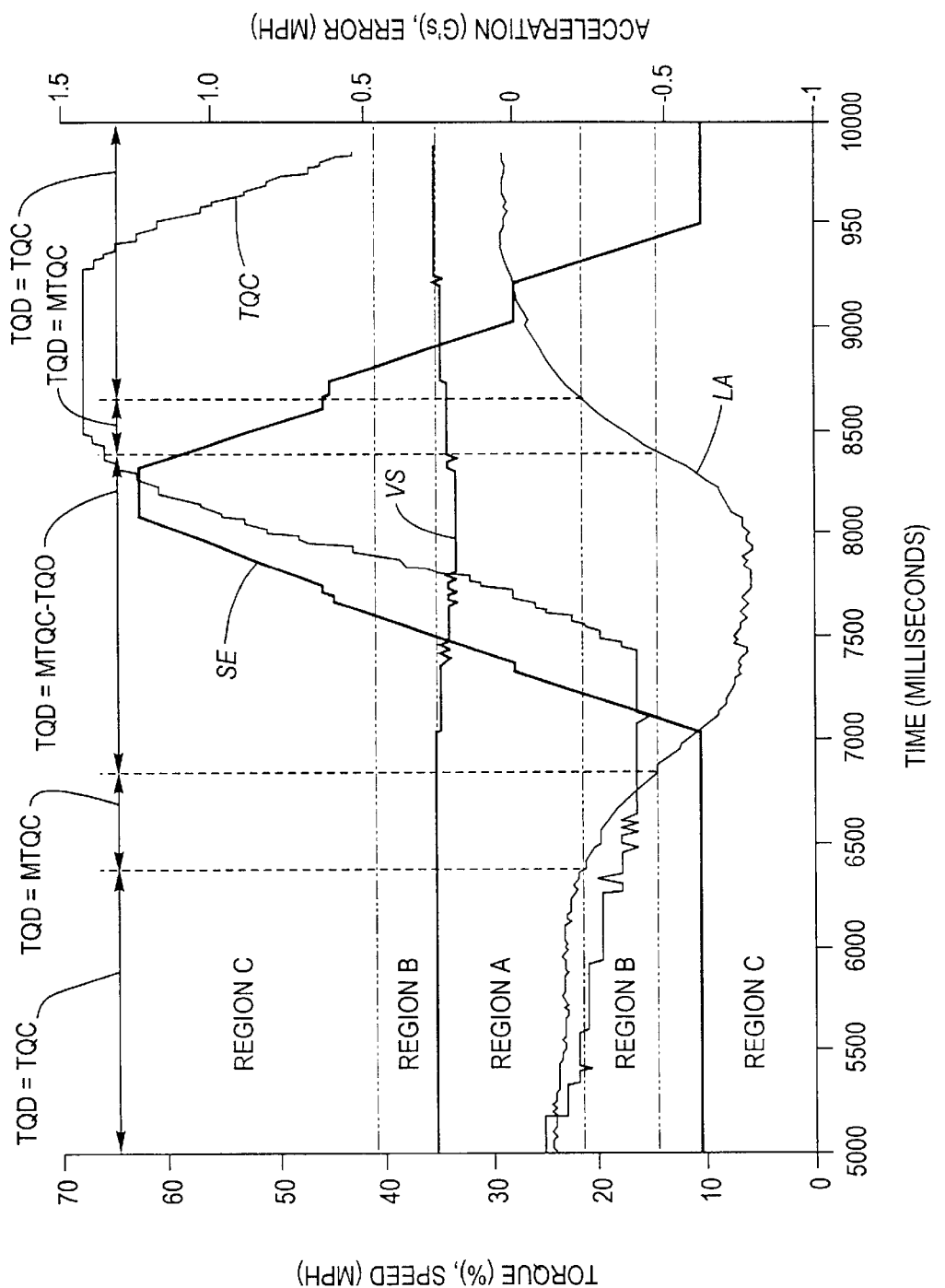
FIG. 2 is a chart defining compensation regions of the cruise control and providing sample measurements of a vehicle driven through a curved section of road in accordance with the present invention.

As depicted at FIG. 2, as a vehicle is driven along a road, vehicle speed (VS), vehicle speed error (SE), torque command (TQC) and lateral acceleration (LA) vary depending upon the curvature of the road. Accordingly, three regions of lateral acceleration compensation are provided within the cruise control 100. Region A is defined by an LA between 0 and the LLAL. Region B is defined by an LA between the LLAL and the HLAL. Region C is defined by an LA greater than the HLAL.

The TQC is not compensated when the LA is within Region A, and TQC is the torque desired TQD, wherein TQD is a torque command signal that controls vehicle dynamics 106 (ie., the throttle plate angle of rotation), and hence, the level of torque produced by the engine for purposes of controlling the longitudinal acceleration which thereby maintains the vehicle speed set by the driver at a speed control switch.

When the LA exceeds the LLAL and enters into region B, if the TQC remains constant or decreases, the TQD is not compensated, and TQC is the TQD. However, if the TQC increases, the TQC is compensated by assigning TQC to a minimum torque command value (MTQC), wherein MTQC is now the TQD. MTQC is defined as a value of TQC which is clamped to the value of the TQC when the LA equaled the LLAL. If the LA exceeds the HLAL and enters into region C, then the TQC is compensated further by subtracting a torque offset (TQO) from the value of MTQC. By subtracting the TQO from the MTQC, the cruise control 100 decreases the speed of the vehicle. The TQO is calculated using the following relation:

$$TQO=Kp*(DLA_k)+Kd*(DLA_k-DLA_{k-1})/T, \quad (3)$$

where $DLA_k$ represents a present sampling of differential lateral acceleration, $DLA_{k-1}$ represents a prior sampling of differential lateral acceleration. T is the time interval between samplings. Kp, in units of "percent torque per G", wherein G is a unit of acceleration, is a calibration parameter that defines the proportional portion of a classic proportional-derivative controller used to perform the required level of corrective action, wherein the proportional part of the control acts only on the difference, DLA, between the vehicle's actual lateral acceleration and the calibrated lateral acceleration limit HLAL; a typical numerical value of Kp is −65, applicable to a full-size V8 engine passenger car. Finally, Kd, in units of "percent torque seconds per G", represents the controller's calibrated derivative gain parameter which sensitizes the control scheme to the RDLA; a typical numerical value of Kd is −5, applicable to a full-size V8 engine passenger car. It will be seen that by using relation (1), relation (3) may be written as:

$$TQO=Kp*(LA-HLAL)_k+Kd*((LA-HLAL)_k-(LA-HLAL)_{k-1})/T. \quad (4)$$

A software program for implementing the cruise control 100 is disclosed in the flow charts of FIGS. 3 through 6.

Figure 3:
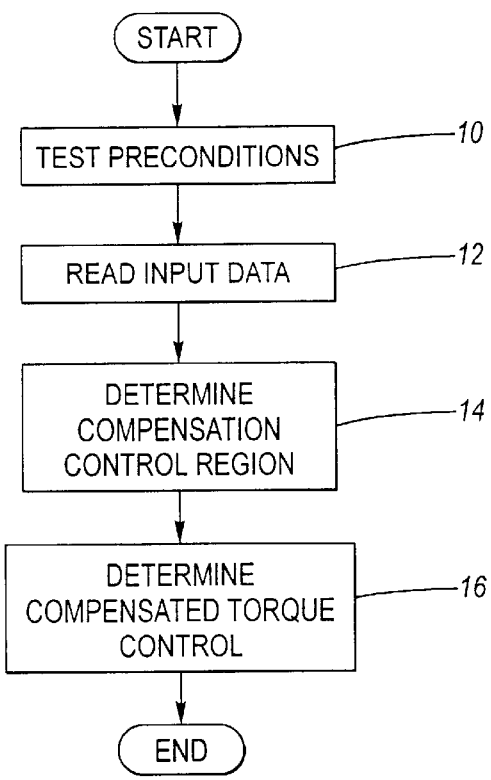
FIG. 3 is a summary flow chart of a software program for the cruise control in accordance with the present invention.

A summary of the software program is shown in FIG. 3. Various vehicle sensors having to do with the motion of the vehicle are checked in process block 10. The value of all parameters needed to determine the compensation control region are entered in process block 12. The value of lateral acceleration (LA) is compared to the low lateral acceleration limit (LLAL) and the high lateral acceleration limit (HLAL) in process block 14. The torque offset (TQO) is selectively calculated and the TQC is selectively compensated in process block 16 to derive the TQD.

Figure 4:
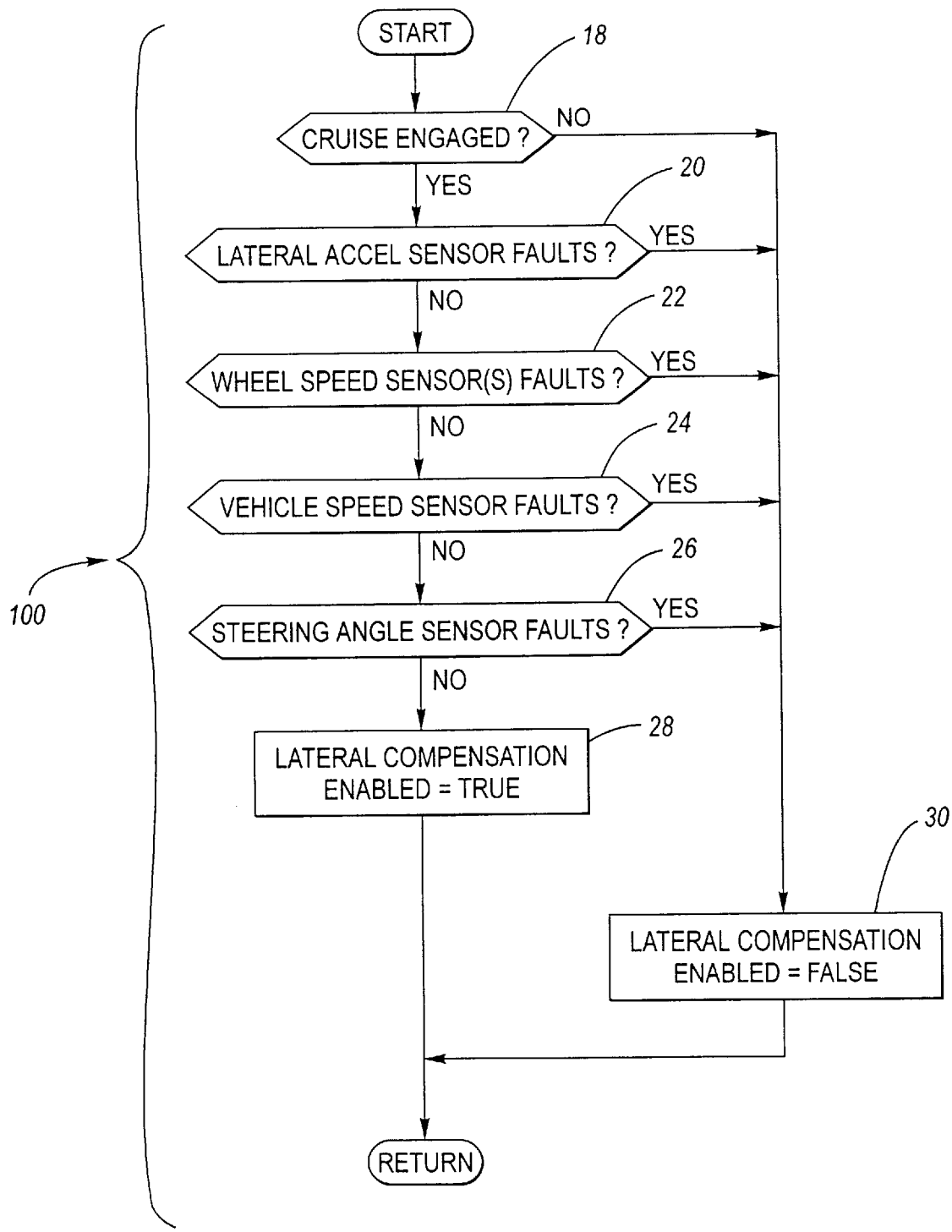
FIG. 4 is a flow chart of a preconditions test of a software program for the cruise control in accordance with the present invention.

FIG. 4 depicts a sensors check routine of the test preconditions process block 10 of FIG. 3. The engagement of the cruise control is tested in decision block 18. If the cruise control is engaged, the program continues, if not, the lateral compensation is disabled in process block 30. The operation of the lateral acceleration sensor is tested in decision block 20. If the lateral acceleration sensor is operational, the program continues; if not, the lateral compensation is disabled in process block 30. The operation of the wheel speed sensors is tested in decision block 22. If the wheel speed sensors are operational, the program continues; if not, the lateral compensation is disabled in process block 30. The operation of the vehicle speed sensor is tested in decision block 24. If the vehicle speed sensor is operational, the program continues; if not, the lateral compensation is disabled at process block 30. The operation of the steering angle sensor is tested in decision block 26. If the vehicle speed sensor is operational, the lateral compensation is enabled in process block 28; if not the lateral compensation is disabled in process block 30.

The program then continues on to process block 12 of FIG. 3, where sensed data is input, and then continues on to process block 14.

Figure 5:
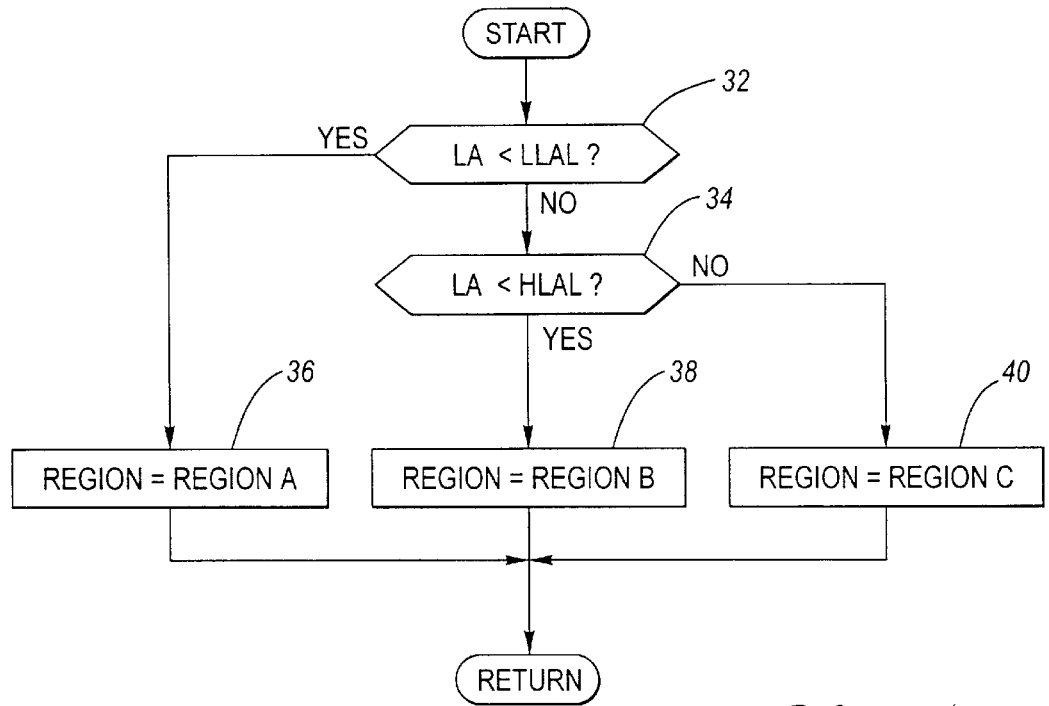
FIG. 5 is a flow chart of a compensation region determination of the software program for a cruise control in accordance with the present invention.

FIG. 5 discloses a routine for determining the compensation control region at process block 14 of FIG. 3. In decision block 32, if the value of lateral acceleration (LA) is less than the low lateral acceleration limit (LLAL), the value of LA is in region A and the region variable is set equal to "Region A" in process block 36. If the value of LA is greater than the LLAL, the program continues. In decision block 34, if the value of LA is less than the high acceleration limit (HLAL), the value of LA is in region B and the region variable is set equal to "Region B" in process block 38. If the value of LA is greater than the HLAL, the value of LA is in region C and the region variable is set equal to "Region C" in process block 40. The program then continues to process block 16 of FIG. 3.

Figure 6:
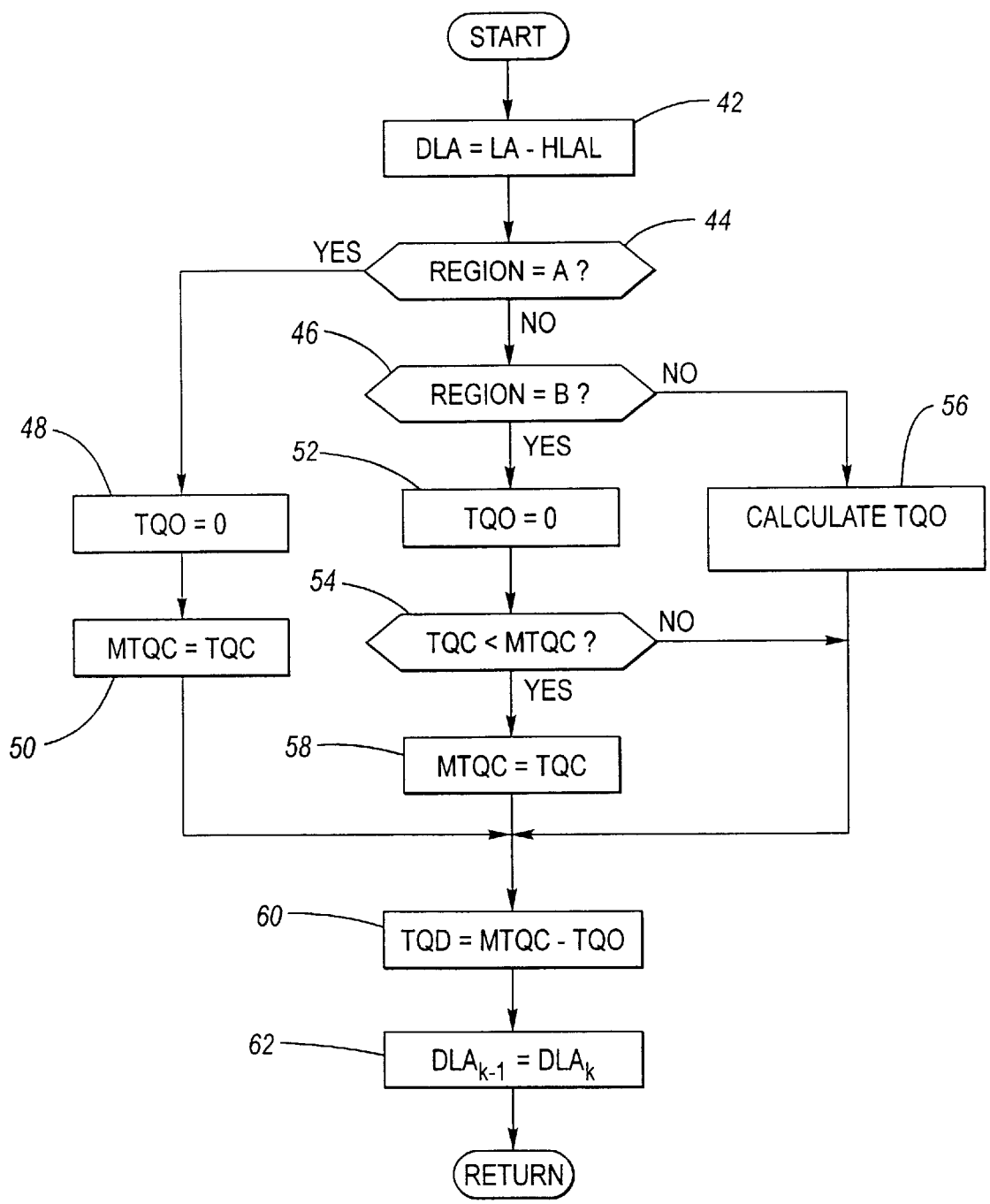
FIG. 6 is a flow chart of a compensation portion of a software program for the cruise control in accordance with the present invention.

FIG. 6 discloses a routine for determining the TQD that provides compensation torque control at process block 16 of FIG. 3. The value of the high lateral acceleration limit (HLAL) is subtracted from the lateral acceleration (LA) to determine the differential lateral acceleration (DLA) in process block 42.

In decision block 44, if the region variable is equal to "Region A" then the TQO is set equal to zero in process block 48 and the MTQC is set equal to TQC in process block 50, TQD is set equal to MTQC minus TQO in process block 60 (which simply results in TQD being set equal to TQC), the previous value of differential lateral acceleration is set equal to the present value of differential lateral acceleration in process block 62, and the program returns to the start.

If the region variable is not equal to "Region A", the program continues to decision block 46. In decision block 46, if the region variable is equal to "Region B" then the TQO is set equal to zero in process block 52. In decision block 54, if the TQC is less than MTQC, then MTOC is set equal to TQC in process block 58, TQD is set equal to MTQC minus TQO in process block 60 (which results in TQD being set equal to TQC), the previous value of differential lateral acceleration is set equal to the present value of differential lateral acceleration in process block 62, and the program returns to the start. In decision block 54, if the TQC is not less than MTQC, then TQD is set equal to MTQC minus TQO in process block 60 (which results in TQD being set equal to MTQC), the previous value of differential lateral acceleration is set equal to the present value of differential lateral acceleration in process block 62, and the program returns to the beginning.

In decision block 46, if region is not equal to "Region B" (meaning region equals "Region C"), then the torque offset (TQO) is calculated according to relation (3) in process block 56, TQD is set equal to MTQC minus TQO in process block 60, the previous value of differential lateral acceleration is set equal to the present value of differential lateral acceleration in process block 62, and the program returns to the beginning.

While particular embodiments of the invention have been shown and described, those skilled in the art will appreciate that changes and modifications may be made without departing from the invention in its broader aspects, and therefore, the aim in the appended claims is to cover all such changes and modifications as fall within the true spirit and scope of the invention.

What is claimed is:

1. A method of controlling a cruise control system, comprising the steps of:
   assigning a low lateral acceleration limit;
   assigning a high lateral acceleration limit;
   determining a lateral acceleration of a vehicle;
   comparing the lateral acceleration to the low and high lateral acceleration limits;
   monitoring a torque command of a torque control computer at least where the lateral acceleration is above the low lateral acceleration limit; and
   compensating the torque command by setting the torque command equal to a minimum torque command where the lateral acceleration is between the low and high lateral acceleration limits and the torque command increases.

2. The method of claim 1, wherein said minimum torque command is substantially equal to a value of the torque command when the lateral acceleration equaled the minimum lateral acceleration limit.

3. The method of claim 1, further comprising:

compensating the torque command by setting the torque command equal to the minimum torque command minus an offset torque wherein the lateral acceleration is greater than the high lateral acceleration limit.

4. The method of claim 3, wherein the offset torque is substantially equal to $Kp*(LA-HLAL)_k + Kd*((LA-HLAL)_k - (LA-HLAL)_{k-1})/T$, wherein LA is the lateral acceleration, HLAL is the high lateral acceleration limit, T is a predetermined time interval between samplings, k represents a present sampling value, k−1 represents a prior sampling value, Kp is a first predetermined constant, and Kd is a second predetermined constant.

5. The method of claim 3, wherein said minimum torque command is substantially equal to a value of the torque command when the lateral acceleration equaled the minimum lateral acceleration limit.

6. The method of claim 5, further comprising:

compensating the torque command by setting the torque command equal to the minimum torque command minus an offset torque wherein the lateral acceleration is greater than the high lateral acceleration limit.

7. The method of claim 6, wherein the offset torque is substantially equal to $Kp*(LA-HLAL)_k + Kd*((LA-HLAL)_k - (LA-HLAL)_{k-1})/T$, wherein LA is the lateral acceleration, HLAL is the high lateral acceleration limit, T is a predetermined time interval between samplings, k represents a present sampling value, k−1 represents a prior sampling value, Kp is a first predetermined constant, and Kd is a second predetermined constant.

8. A method of controlling a cruise control system, comprising the steps of:

assigning a low lateral acceleration limit;

assigning a high lateral acceleration limit;

determining a lateral acceleration of a vehicle;

comparing the lateral acceleration to the low and high lateral acceleration limits;

monitoring a torque command of a torque control computer at least where the lateral acceleration is above the low lateral acceleration limit;

compensating the torque command by setting the torque command equal to a minimum torque command where the lateral acceleration is between the low and high lateral acceleration limits and the torque command increases; and compensating the torque command by setting the torque command equal to the minimum torque command minus an offset torque wherein the lateral acceleration is greater than the high lateral acceleration limit.

9. The method of claim 8, wherein said minimum torque command is substantially equal to a value of the torque command when the lateral acceleration equaled the minimum lateral acceleration limit; and wherein the offset torque is substantially equal to $Kp*(LA-HLAL)_k + Kd*((LA-HLAL)_k - (LA-HLAL)_{k-1})/T$, wherein LA is the lateral acceleration, HLAL is the high lateral acceleration limit, T is a predetermined time interval between samplings, k represents a present sampling value, k−1 represents a prior sampling value, Kp is a first predetermined constant, and Kd is a second predetermined constant.

* * * * *